Jan. 5, 1943.　　　A. MUSZYNSKI　　　2,307,465

FRYING APPARATUS

Filed June 20, 1940

INVENTOR.
Antoni Muszynski
BY Walter C. Ross, Attorney.

Patented Jan. 5, 1943

2,307,465

UNITED STATES PATENT OFFICE 2,307,465

FRYING APPARATUS

Antoni Muszynski, Southampton, Mass.

Application June 20, 1940, Serial No. 341,481

2 Claims. (Cl. 126—345)

My invention relates to improvements in a frying apparatus and is directed to a frying apparatus which is characterized by its novel construction and further by its unique efficiency in operation.

According to special features of my invention, the apparatus includes a vat or a pan for frying materials, such as fat or oily substances, which is supported over a heating means in such a way that the fatty or oily substance or substances are heated more economically and more quickly than has heretofore been possible.

According to another feature of my invention, the pan or vat is constructed in such a manner as to provide uniform heat throughout its heated area.

The invention consists in certain novel features of construction and in the combination and arrangement of parts as will be hereinafter more particularly pointed out in the claims hereunto annexed and more fully described and referred to in connection with the accompanying drawing wherein:

Figure 2:
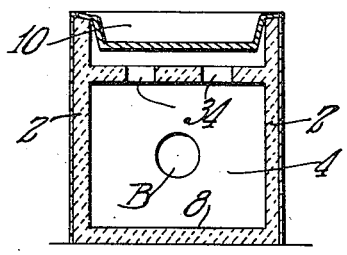
Fig. 2 is a sectional elevational view on the line 2—2 of Fig. 1.
Figure 1:
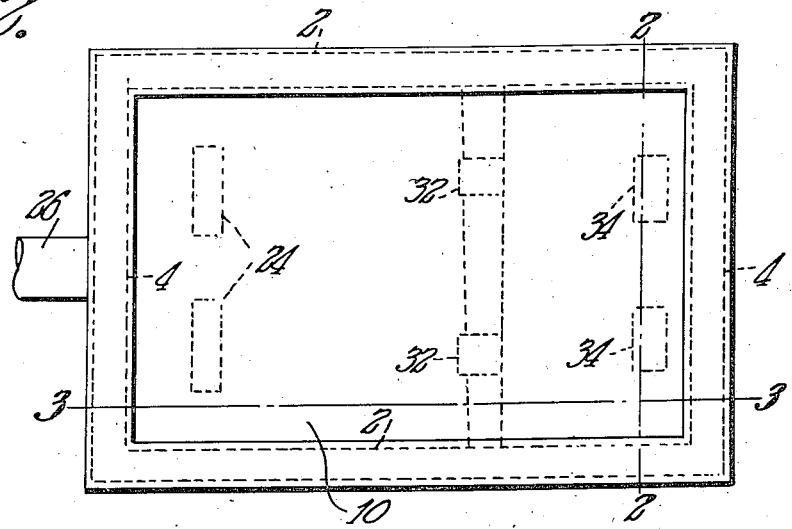
Fig. 1 is a plan view of the frying apparatus of my invention.

Referring to the drawing more in detail, wherein similar reference figures refer to like parts, and referring more particularly to the preferred form of my invention, which has been selected for illustrative purposes, I have shown end walls, such as 2 and 4, which are connected to form a base. These walls may be formed from any suitable insulating or refractory material and may be suitably sheathed by metal sheets or plates, substantially as shown.

A horizontal wall 5 extends inwardly from one end wall 4 to an inner vertical wall 6. This vertical wall 6 is connected at its lower side by a wall 8 to the other end wall 4 and it is spaced therefrom substantially as shown so as to provide a combustion chamber 20 as will appear.

A pan or vat, which is represented by 10, is provided, and this may have a peripheral flange or flanges such as 12. The pan is preferably supported on the side and end walls as shown.

Figure 3:
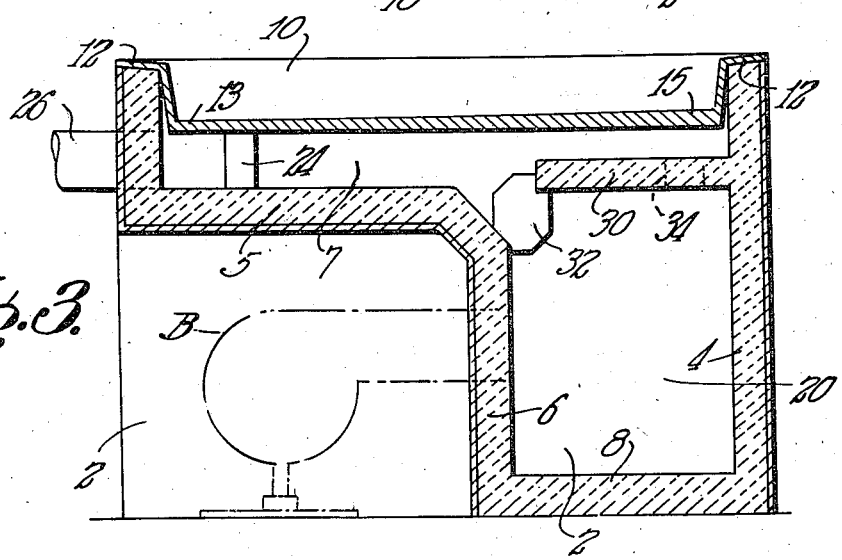
Fig. 3 is a sectional elevational view on line 3—3 of Fig. 1.

The walls 2, 5 and 6, form a compartment for such a heating device as an oil burner B which is represented in Fig. 3 by dot-dash lines. The burner is arranged to direct products of combustion into the combustion chamber 20 which is provided between the walls 4 and 6 and beneath one end of the pan 10. Furthermore, the wall 5 is spaced below the pan 10 so as to provide a passageway 7 therebelow extending from the combustion chamber 20 to a stack or flue 26 which extends outwardly from the passageway to the outside. A baffle or baffles 24 are provided between the pan 10 and the wall 5, and are spaced from the side walls so as to provide spaces whereby the gases are permitted access to and through the stack 26 although impeded to some extent. The baffle 24 has the further advantage of providing a "wiping" effect whereby more of the heat in the passageway is retained within the apparatus itself.

The apparatus may be used for various purposes but one use for which it is particularly adapted is for the frying of foods, such as doughnuts and the like. In such a case, the fat or the frying substance used is placed in the pan 10 and the burner B is then operated. The arrangement is such that hot gases will impinge the pan 10 which is disposed over the chamber 20 and will travel along beneath the pan past the openings at the ends of baffle 24 and out the flue 26. It is not only desired but also necessary to operate the apparatus with a minimum amount of fuel and this is accomplished by reason of the novel construction which I have described above.

It is desirable and it is furthermore necessary that the frying material be uniformly heated throughout the entire area of the pan. In view of the novel construction which brings about this minimum fuel consumption, the material in the pan which is disposed directly over the combustion chamber would be heated to a higher temperature than that at the left thereof. To bring about a uniform heating, the bottom wall of the pan at 15 is of greater thickness than at 13 shown in Fig. 3. This arrangement brings about the desired uniform heating of the material in the pan throughout the area thereof.

A baffle member 30 is disposed below the pan 10 and in the combustion chamber 20, substantially as shown. This baffle is supported by securement at one end to the adjacent end wall 4 and at the other end by a supporting post or posts 32.

This baffle member provides a member over the combustion chamber so as to prevent flame from directly striking the part of the pan disposed thereover. Due to the radiation of the flame, this close proximity between the flame and pan might be objectionable.

If it is desired, apertures 34 may be provided in the baffle 30 so as to permit hot gases from the combustion chamber to escape therethrough so as to assist in the heating of the pan directly thereover. Such openings may be sized proportionate to the rate of combustion in the chamber 20 so that at no time do hot gases escaping in this way cause an increase in the amount of heat at this end of the pan as compared with the amount of heat at the other end or at either side.

Manifestly the specific details of construction may be considerably varied from those herein shown and described without involving any departure from the principle of the invention or sacrificing any of the advantages inherent therein. While I have described my invention in this specification in great detail and particularly with respect to the present preferred form thereof, it is not desired to be limited thereto since many changes and modifications may be made therein without departing from the spirit and scope of the invention.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations coming within the meaning and purview and range of equivalency of the appended claims are therefore intended to be embraced therein.

What it is desired to claim and secure by Letters Patent of the United States is:

1. A frying apparatus of the class described comprising in combination, a casing having side and end walls of refractory material, a pan supported by the upper portions of said walls and having a bottom wall, a horizontal wall of refractory material extending inwardly from one end wall between said side walls adjacent thereto spaced below said bottom wall of the pan and forming therewith a passageway, said horizontal wall terminating at a distance from the other end wall, a vertical downwardly extending wall connected to the termination of said horizontal wall and to said side walls providing a burner compartment adjacent said one end wall and a separate closed combustion chamber adjacent said other end wall below one end of said pan in communication with said passageway, a flue at the end of the passageway opposite to the combustion chamber whereby hot gases pass from the combustion chamber through the passageway to said flue, and a wall extending inwardly from said other end wall and side walls adjacent thereto spaced below said pan and terminating at a distance from the jointure of the said horizontal and vertical walls forming a restricted passageway from the combustion chamber into the first-named passageway.

2. An apparatus of the class described comprising in combination, a casing formed from vertically disposed end and side walls of refractory material, a pan having end, side and horizontal bottom walls with upper portions of said side and end walls supported by the walls of the casing, a horizontal wall extending inwardly from one end wall of the casing between the side walls thereof spaced below the bottom wall of the pan and terminating at a distance from the other end wall forming a passageway in conjunction with said side walls below the bottom wall of the pan, a vertically disposed wall at the termination of the horizontal wall forming with said side walls, horizontal wall and one end wall a burner compartment and with said side walls and other end wall a separate closed combustion compartment beneath one end of said pan, a horizontal wall extending over said combustion chamber from the other end wall between said side walls spaced below said pan bottom wall and terminating at a distance from said vertical wall providing therewith a restricted passageway from said combustion chamber to said first-named passageway, a baffle in the first named passageway spaced from said side walls forming the first-named passageway into restricted separate openings, and a flue associated with said one end wall leading from said first-named passageway, whereby hot gases pass from the combustion chamber through said restricted passageway into and through the first-named passageway and restricted openings to said flue.

ANTONI MUSZYNSKI.